July 8, 1958  J. H. GRUVER  2,842,612
DATA TRANSFER APPARATUS
Filed April 8, 1953  8 Sheets-Sheet 1

Inventor
John H. Gruver
By Wallace and Cannon
Attorneys

July 8, 1958  J. H. GRUVER  2,842,612
DATA TRANSFER APPARATUS
Filed April 8, 1953  8 Sheets-Sheet 2

Inventor
John H. Gruver
By Wallace and Cannon
Attorneys

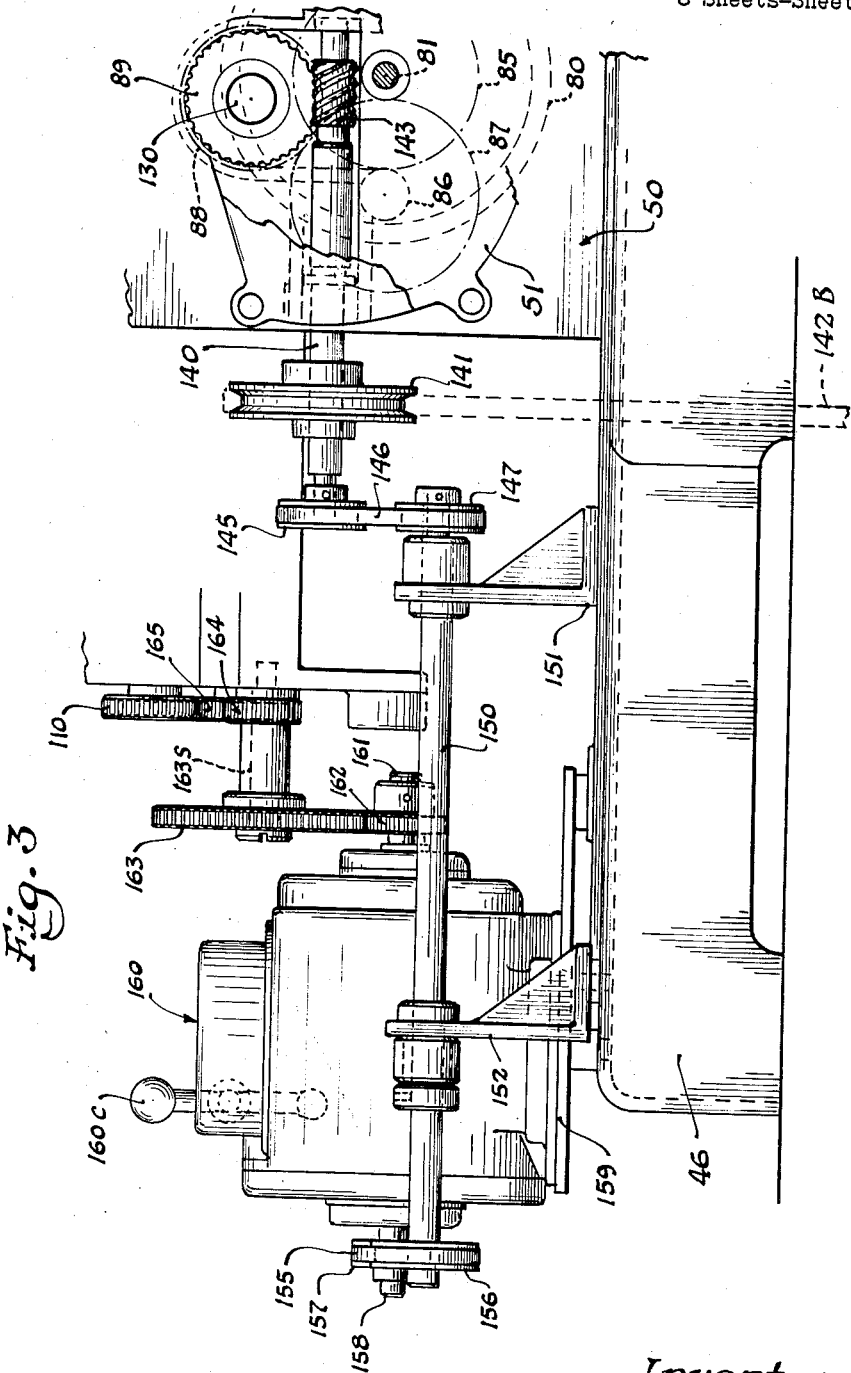

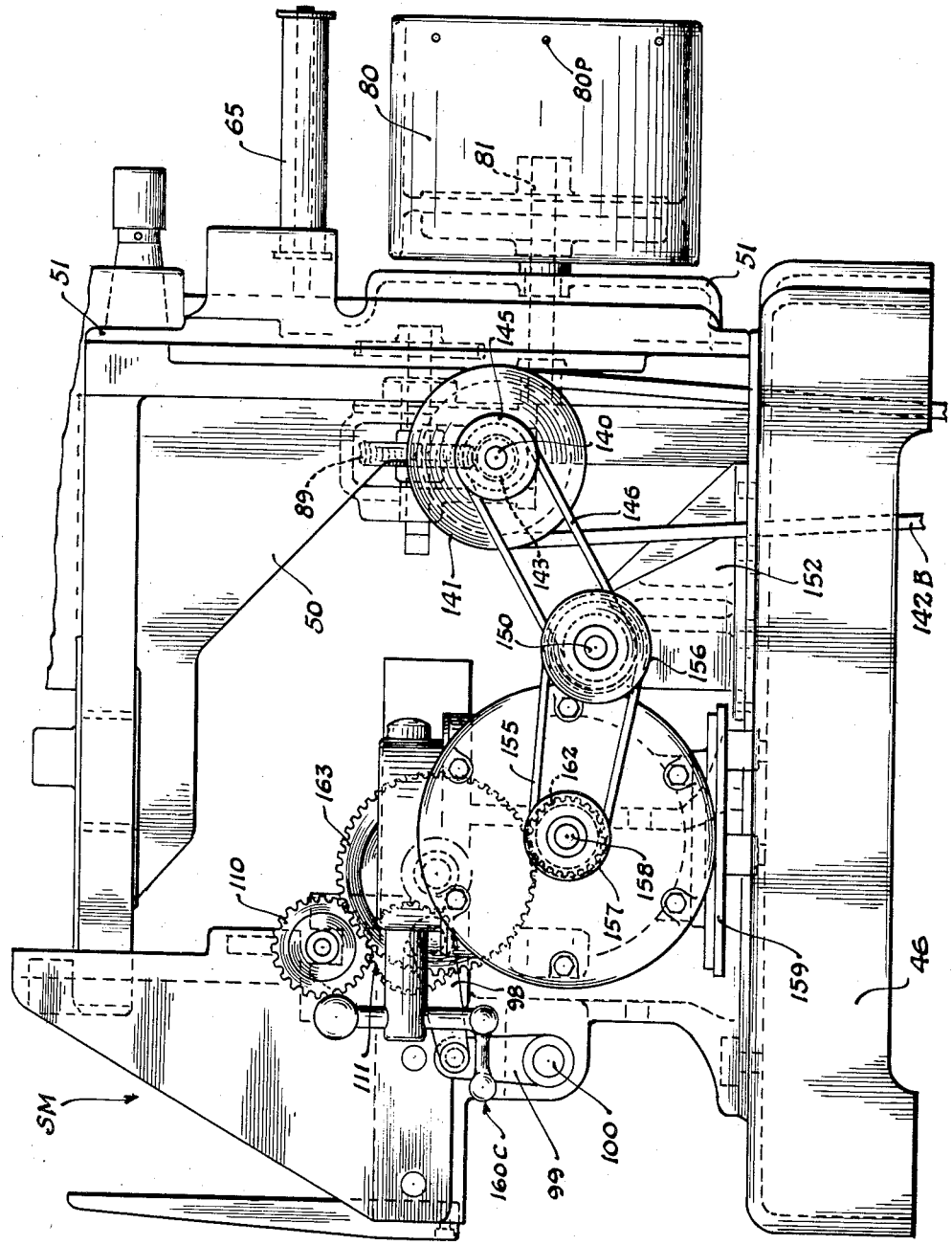

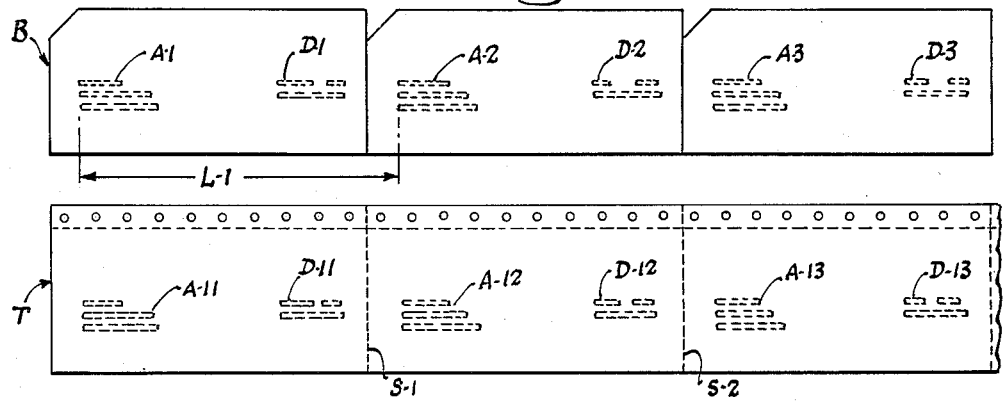
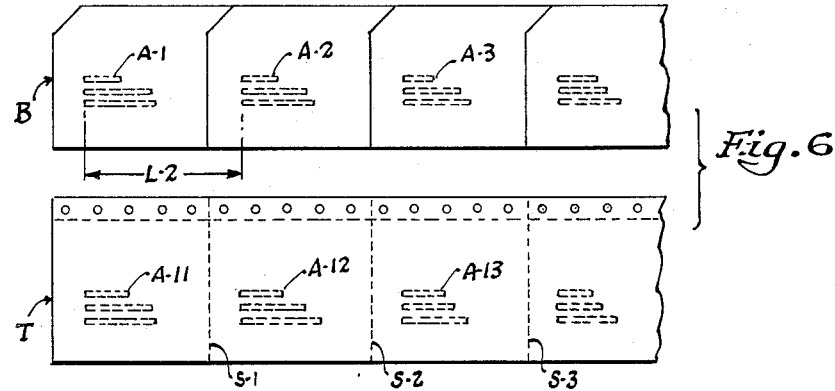
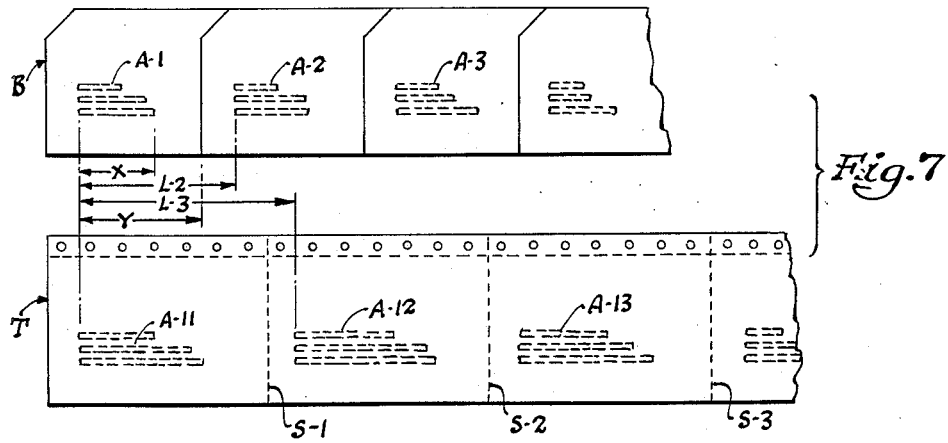

July 8, 1958

J. H. GRUVER 2,842,612

DATA TRANSFER APPARATUS

Filed April 8, 1953

Inventor
John H. Gruver
By Wallace and Cannon
Attorneys

July 8, 1958 J. H. GRUVER 2,842,612
DATA TRANSFER APPARATUS
Filed April 8, 1953 8 Sheets-Sheet 7

Inventor
John H. Gruver
By Wallace and Cannon
Attorneys

July 8, 1958 J. H. GRUVER 2,842,612
DATA TRANSFER APPARATUS
Filed April 8, 1953 8 Sheets-Sheet 8

Inventor
John H. Gruver
By Wallace and Cannon
Attorneys

United States Patent Office 2,842,612
Patented July 8, 1958

2,842,612

DATA TRANSFER APPARATUS

John H. Gruver, Cleveland Heights, Ohio, assignor to Addressograph-Multigraph Corporation, Wilmington, Del., a corporation of Delaware Application April 8, 1953, Serial No. 347,600

11 Claims. (Cl. 178—6.6)

This invention relates to a printing machine which utilizes a facsimile method of reproduction wherein printed data carried by one instrumentality in the machine is reproduced on another instrumentality. The present invention is primarily concerned with the manner in which the speed of such instrumentalities in their separate paths through the machine is to be regulated and controlled as well as correlated one to the other.

The printing machine which embodies the principles of the present invention depends upon a known facsimile method of reproduction in that the instrumentality bearing the printed record data which is to be reproduced has elemental areas of the printed characters progressively scanned by photoelectric scanning means to produce a timed succession of electric control signals or impulses representative of the scanned characters, and these signals are utilized to control a printing head. At the printing head, a printing vibrator is operated and controlled in accordance with these signals and the arrangement is such that the vibrator prints the aforesaid record on a copy strip. It will be seen that in the printing operation thus set forth, the data carried by the record is scanned at one station and transmitted to another where reproduction is effected, and one example of such printing operation relates to the reproduction of addresses or like data carried by business cards such as the Hollerith type business card. In this particular instance, the business cards from which the address data is to be reproduced are advanced sequentially one by one along one path in the machine to a scanning station where the data carried by the individual business cards is photoelectrically scanned. The copy instrumentality which is to be printed may assume the form of an endless web or strip such as a mailing strip which is advanced along another path in the machine to the printing station where the vibrator is effective to print the individual addresses a regular distance apart on the mailing strip.

The business cards referred to above may carry printed data other than addresses, and such other data might, for instance, include a premium notice or a subscription expiration data or a simple billing notice. It generally follows that in some instances it may or may not be necessary to reproduce on the copy strip some or all of such other data simultaneously with the address, and one object of the present invention is to permit only desired portions of the printed data carried by business cards or like discrete record instrumentalities to be reproduced at the printing station by controlling the area of the cards to be scanned.

The type of printing machine to which the present invention relates, as was noted above, utilizes an electronically controlled armature or vibrator at the printing station, and in the form of the machine thus disclosed herein, this printing vibrator is effective to reproduce the record as the copy travels opposite. The printing operation performed by the vibrator is of such nature that movement of the copy opposite the vibrator is necessary, and from that it will be realized that the speed of the copy at the printing station in the machine will determine the spread of the printed image. That is, assuming a vibrator operating at constant speed at the printing head, and certain data containing a fixed number of characters in a given line, the printed line on the copy containing this data may be lengthened or shortened by increasing or decreasing, respectively, the speed of the copy.

There are many different applications for the present machine wherein shorter or longer addresses may be desired. A mailing strip, for instance, utilizes a relatively short address whereas a premium notice or billing in a window envelope will usually be somewhat larger. Therefore, a further object of the present invention is to permit the number of printed characters per unit of length on the printed instrumentality to be selected and adjusted in a printing machine of the foregoing type.

Additional objects of the present invention are to permit the respective feeds of business cards and copy sheets in a printing machine of the foregoing type to be easily adjusted to different and varying circumstances, and to permit these respective feeds to be related in a predetermined way one to the other.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of appended claims.

In the drawings:

Fig. 3 is a detail elevation on an enlarged scale of another portion of the machine shown in Fig. 1, being broken away in part;

Fig. 4 is a side elevation of the machine shown in Fig. 1, being broken away in part;

Figs. 5, 6 and 7 are diagrammatic views illustrating certain relationships between the instrumentalities employed in the present printing machine;

Figure 8:
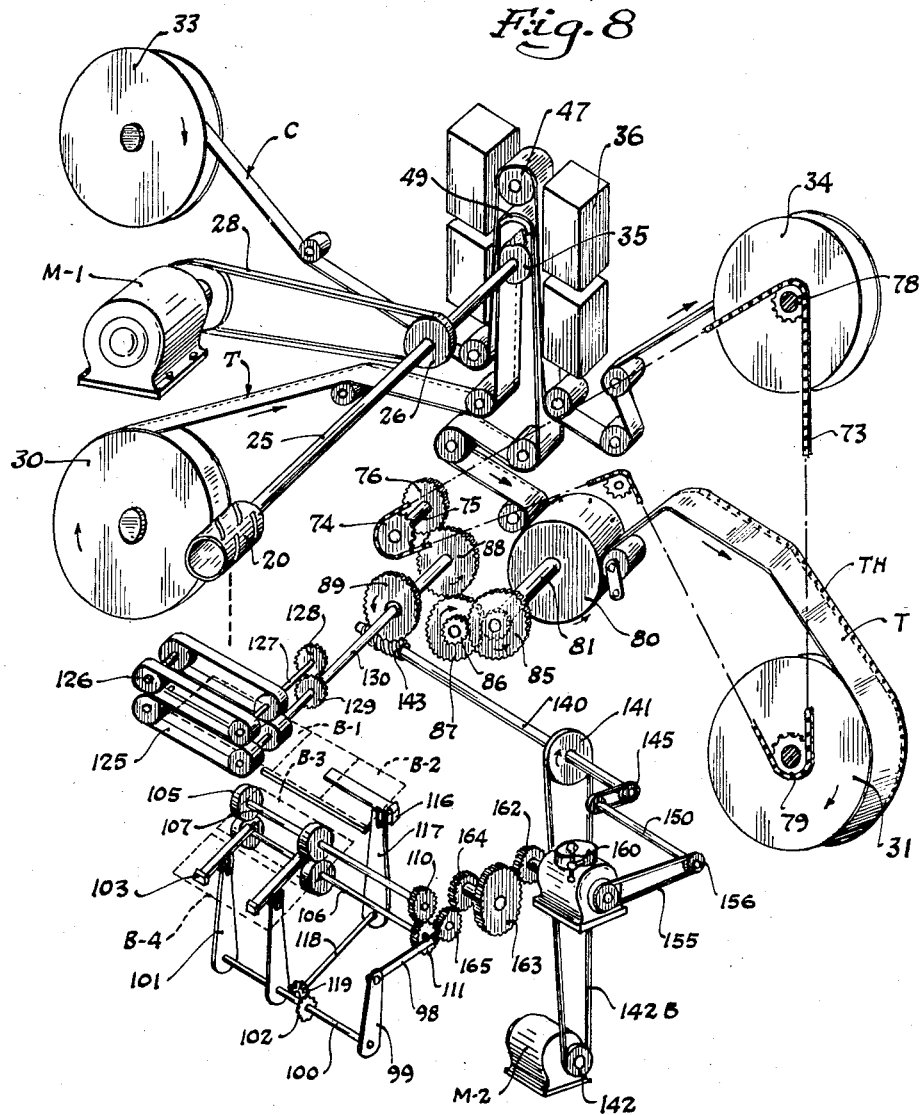
Fig. 8 is a schematic view illustrating the relation of certain of the operating parts of the printing machine.

For purposes of disclosure, the present invention is illustrated in Figs. 1 to 11 as embodied in a printing machine which is arranged to print by a facsimile method of reproduction and in the form of the invention thus illustrated discrete instrumentalities such as business cards B, Figs. 5 to 8, each carrying printed material or data to be reproduced, are advanced along one path in the machine to a scanning station S, and at this location in the printing machine a constantly rotating scanning head 20, Fig. 8, is effective to establish a scanning action whereby signals corresponding to the data on the cards to a photoelectric cell, not shown, located inside the rotating scanning head 20. The scanning head 20 is carried at one end of a driven shaft 25, and at the other end this shaft carries a rotating printing drum 35, or impression cylinder, so that in every instance the angular speed of the scanning head 20 and the drum 35 is precisely the same. The location of the drum 35 defines generally the printing station P, Fig. 8, of the machine, and here the instrumentality to be printed and a carbon tape are brought together.

Figure 2:
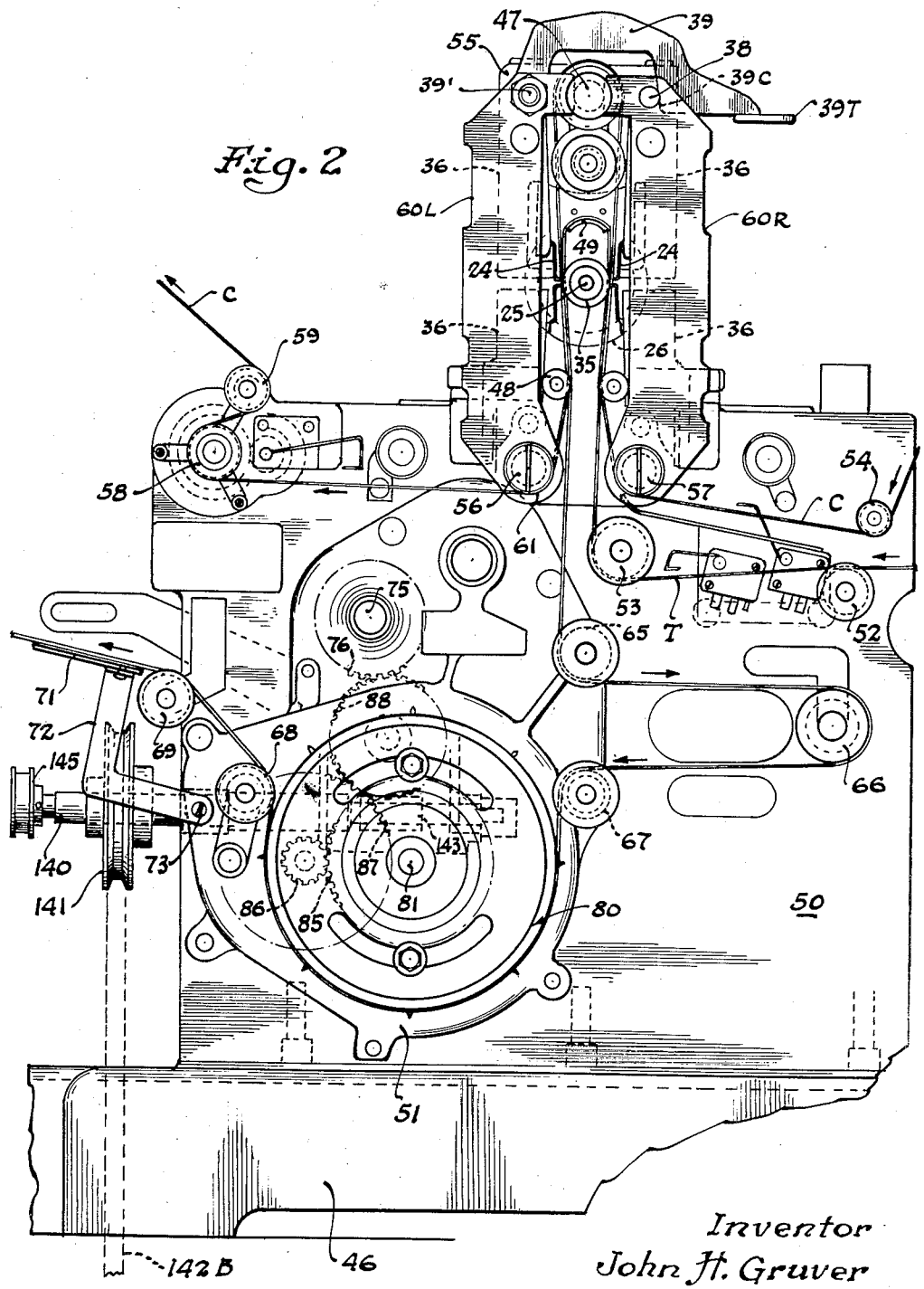
Fig. 2 is an elevation on an enlarged scale of a portion of the machine shown in Fig. 1, being broken away in part.

Associated with the drum 35 at the printing station P are four electromagnetic vibrators 24, Fig. 2, which are arranged in a corresponding number of electromagnetic printing heads as 36 which are disposed in pairs at opposite sides of the drum 35. The drum 35 is formed with at least one helical ridge around its periphery, and as the drum rotates synchronously with the shaft 25 and scanning head 20, the helical ridge will travel back and forth opposite the vibrators. The displacement of the vibrators relative to the helical ridge is such that the latter serves a printing anvil or impression member, and hence, when operating, the vibrators are effective to press the copy and carbon against the helical ridge on the drum 35 accordingly as they receive intermittent black and white signals from the scanning head. Thus, the vibrators are driven forward only on signals representative of black, and in this manner the record contained on each of the instrumentalities as the business cards B at the scanning station S is printed at the printing station P on the copy instrumentality T.

The above describes a known facsimile system which is completely described in the United States Patents Nos. 2,510,200, 2,571,720, 2,571,785 and 2,578,307, issued to Russell G. Thompson, and since the manner in which the control signals created at the scanning station S in accordance with the record image and transmitted to the printing station P to actuate the printing vibrators as 24, is fully described in these patents, further description in this regard is deemed unnecessary for present purposes, especially since the present invention is not directed to this detail of the printing machine.

Figure 1:
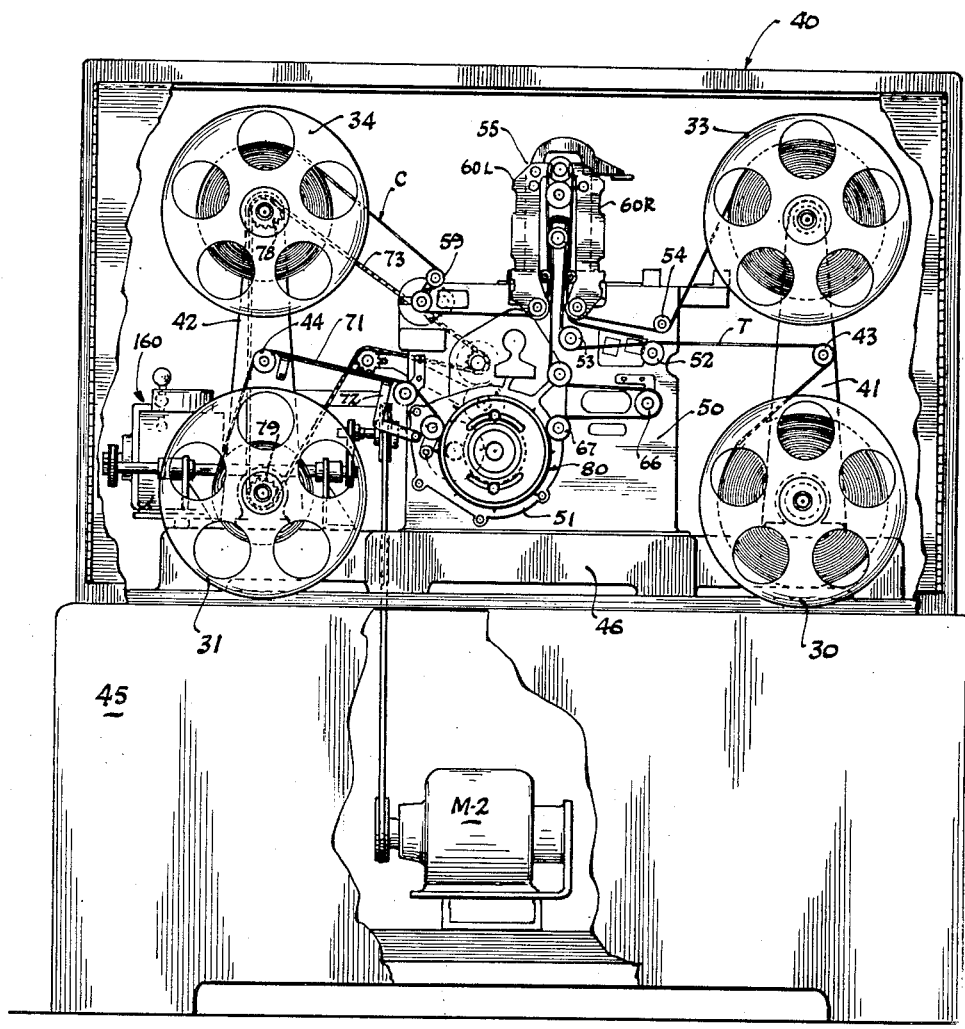
Fig. 1 is a rear elevation of the printing machine embodying the principles of the present invention.

As shown in Fig. 1, which is a rear elevation, the printing machine in the present instance is adapted to be housed in a rectangular cabinet 40 which is supported above floor level on a table 45, and secured to the top of the table 45 is a base structure 46, Figs. 2, 3 and 4, which serves to mount and support many of the operating parts of the printing machine which will be pointed out in detail below. Secured on the base support 46 at a central location is a relatively large rectangular casting plate 50 that is disposed in a generally vertical plane at the back of the machine so as to project upwardly toward the top of the cabinet 40, and this casting serves as a mount for many of the guide rollers that are associated with the respective carbon tape and copy strip feeds mentioned above. The main casting plate 50 also serves as a support for a transmission housing 51, Figs. 2 and 4, which will be referred to in more detail hereinbelow.

Supported at the top of the main casting support plate 50 is another, but much smaller, casting plate 55 which extends upwardly in vertical relation thereto, and this casting 55 is associated as the supporting member for the various facsimile elements at the printing station P. Thus, for instance, the drive shaft 25, to which are connected the rotating printing drum 35 and the scanning head 20, extends from front to rear in the printing machine on a horizontal axis and is supported for rotation in the casting 55. This drive shaft has fixed thereto a pulley 26 which is driven from a motor M-1 and its belt 28, Fig. 8. The motor M-1 is arranged in a left front position in the printing machine, being out of view in Fig. 1. The printing machine includes another motor, M-2, that is adapted to feed out the carbon tape, the copy strip, and the business cards, but the manner in which this is accomplished under and in accordance with the present invention will be described at another point herein.

As can be seen in Figs. 1 and 2, the carbon tape C and the copy strip T are carried on respective pairs of reels that are located opposite one another on different levels at the back of the printing machine in straddling relation to the vertical support plate 50. Thus, the copy strip T has a supply reel 30 and a take-up reel 31, and the carbon tape C has a supply reel 33 and a take-up reel 34. The reels 30 and 31 for the copy strips are journalably mounted at either side of the base support 46, and in turn the reels 33 and 34 for the carbon tape C are arranged for rotation above the reels 30 and 31 at the top of a pair of opposite mounting posts 41 and 42 which are secured to the base structure 46.

In the course of a printing run, the strip T and tape C are played out from the respective reels 30 and 33 in such a manner that the two come together at the printing station. A drive for these two strips is afforded which includes a main drive shaft 140, Fig. 8, and this same drive shaft 140 also serves to supply power to the feed means for the business cards B. As will be described in detail below, shaft 140 is adapted to drive a feeding pin wheel 80, Fig. 2, for the copy strip T and a chain 73, Fig. 1, for the carbon C.

Referring now to Fig. 1, the copy strip T and the carbon transfer C are arranged to travel from right to left across the back of the machine in toward the main support casting 50, and for this purpose a guide roller 43 on the right hand vertical support post 45, and a pair of related guide rollers 52 and 53, Fig. 2, journalled at the back of the casting plate 50, cooperate to direct the copy strip inwardly along a horizontal path. At the same time, another guide roller 49 on the support casting 50, just above the guide roller 52, directs the carbon tape down from its supply reel 33 toward the copy strip.

At the roller 53, the copy strip T is led upwardly along the vertical casting plate 55, and similarly the carbon tape C passes upwardly in a vertical relation around a roller 56. A pair of rollers 48, Fig. 2, are rotatably supported in opposed spaced relation on the vertical plate 55, and the right one of these rollers is so disposed that the copy T and carbon C are brought together in engaged relation so that beyond the point they will travel upwardly together toward the printing drum 35 and past the right hand pair of vibrators 24 which are effective to print the copy with two lines of data. Just above the drum 35 is a curved shoe 49 about which the copy strip T, now partially printed with the record data from one of the business cards, is played so that the direction of travel of the copy is reversed and directed back down along the other side of the printing station P to the left pair of vibrators where two additional lines of data may be printed on the copy. In the meantime, the carbon C is played around a roller 47 that is spaced vertically above the shoe 49 and then downwardly past the left pair of vibrators 24 in a printing relation with respect to this pair of vibrators and the copy. The carbon then continues to be fed down to the left one of the rollers 48 where the printed copy and the carbon transfer are once again separated for passage to the respective take up or storage reels 31 and 34.

It will be appreciated, of course, that in the arrangement shown the effect of the two opposite sets of vibrators 24 is to transfer printing material from the carbon tape C on to the face of the copy instrumentality T in the form of four lines of data such as addresses, for instance, carried by the business cards B. Of course, precisely the same principles and relations would be concerned were there to be but one line of data printed in each instance and therefore only one printing vibrator 24 to cooperate with the printing drum 35.

As was noted above, the vibrators 24 are each associated with electromagnetic printing heads 36 that are arranged in vertical pairs on opposite sides of the drum 35. These printing heads are thus mounted in pairs on respective elongated vertical frames 60L and 60R which are arranged for outward pivotal movement on pins 56 and 57 projecting in spaced relation from the casting plate 50. This arrangement permits the printing heads 36 to be pivoted away from the drum 35 to expose the printing station for inspection or adjustment. To hold the frames 60L and 60R inwardly in a normal relation with the vibrators 24 disposed in operative position on either side of the drum 35, the right hand frame 60R is provided with a locking pin 38. A U-shaped locking arm 39 is associated therewith, and this arm is pivotally attached at 39' to the left frame 60L. The arm 39 is formed with a locking cam face or edge 39C which is adapted to frictionally engage and lock against the pin 38, the arm 39 being provided with a finger tab 39T which can be gripped by the operator of the machine to raise or lower the arm 39 relative to the pin 38.

After the copy has been printed with the data scanned by the scanning head 20, the copy containing this reproduced data is led downwardly past the left of the two guide rollers 48, Fig. 2, to a guide roller 65, thence to the right to another guide roller 66, thence back to the left to a third guide roller 67, thence down about the feeding pin wheel 80, upwardly from the pin wheel 80 to a tensioning roller 68, thence further to the left on to a guide roller 69 and finally to a brake 71. The brake 71 is mounted on an L-shaped arm 72, and this arm is connected by a screw 73 to the transmission housing 51, and by loosening the screw 73 the brake 71 may be adjusted to vary the tension on the copy tape T. Referring to Fig. 1, it will be noted that a guide roller 44 is located at the left hand end of the brake 71, and as the copy strip T is fed on to the left it passes down about this final guide roller 44 and on to the take-up reel 31.

Considering the carbon transfer C as it leaves the printing station, it will be noted that this tape is directed away from the copy adjacent the pivot for the left frame member 60L by a guide roller 56, Fig. 2, and is thence directed to the left along the back of the printing machine by another guide roller 58, upwardly about the latter to a tensioning roller 59, and from the roller 59 to the take-up reel 34, Fig. 1.

The copy and the carbon advance together through the printing machine, and in order that this may be accomplished a common drive for the pin wheel 80 and the two take-up reels 31 and 34 is provided. This common drive includes a motor M-2 and a main drive shaft 140 driven thereby at a constant speed by a belt 142B that extends between the motor and a pulley 141 on the drive shaft 140. At the right end of the drive shaft 140, as viewed in Fig. 3 is a worm gear 143 that is meshed with a worm wheel 89. The worm wheel is carried on a drive shaft 130 which extends from front to rear in the machine at right angles to the main drive shaft 140, and at its rear end the drive shaft 130 carries a transmitting gear 88, Figs. 2 and 8, which is meshed with an intermediate transmitting gear 87. The gear 87 is mounted on a stub shaft which is rotatably supported in the transmission housing 51, Fig. 2, at the back of the machine and this same stub shaft carries at its other end a change gear 86 which, as shown in Figs. 2 and 8, meshes with another change gear 85 mounted on the drive shaft 81 for the pin wheel 80.

Thus it will be seen that the gear arrangement described above transmits the drive of the shaft 140 to the pin wheel 80 that feeds out the copy strip T, and as will be described in more detail below, the two gears 85 and 86 constitute a change speed mechanism that may be set up to vary the speed of the pin wheel drive shaft 81.

In addition to transmitting a drive to the pin wheel 80, the gear 88 also serves to transmit a drive from shaft 140 to the take-up reels 31 and 34 for the carbon C and the copy T. For this purpose, a chain 73, Fig. 1, is employed in the present instance, and this chain is adapted to be driven by a sprocket 74 fast on one end of a shaft 75, Figs. 2 and 8, that is rotatably supported in the main casting support plate 50 at the back of the printing machine. The shaft 75 also carries a drive gear 76 which is meshed with the transmitting gear 88, and in this manner it will be seen that the drive sprocket 74 is driven at a speed proportional to the speed of the main drive shaft 140.

The take-up reels 31 and 34 carry drive sprockets 78 and 79 respectively that are mounted on the shafts of the sprockets in a driving relation that allows for relative slippage, and as shown in Figs. 1 and 8 the chain 73 passes around the sprockets 78 and 79 in a driving relation. Consequently, during operating the machine the reels 31 and 34 will be constantly over-driven by the chain 73 which, of course, has a speed proportional to that of the main drive shaft 140.

The main drive shaft 140 also serves as a drive for advancing the record instrumentalities such as the business cards B to and through the scanning station S, and for present purposes it may be pointed out that the drive from the shaft 140 is transmitted in such a manner as to impart regular timed oscillations to a horizontal rock shaft 100, Fig. 8, located at the front of the machine as well as to continuously drive a set of conveyor belts 125 at the scanning station. The particular manner in which this is accomplished will be described in more detail below.

Business cards such as the cards B are of course provided in very precise form with regard to their dimensions, data pattern and coded perforations, and in the present printing machine these cards, or other precision instrumentalities like them, are advanced one by one from the bottom of a supply stack that is located in a vertical supply magazine SM, Fig. 4, at the front of the machine. This magazine occupies the position indicated by the bottom-most card in the stack, B-4, illustrated in Fig. 8, and to feed such a bottom-most card from the bottom of the stack a pair of reciprocating feed blades 103 are operatively arranged with the rock shaft 100 to move back and forth beneath the stack of business cards in a definite timed relation. The feed blades 103 are each connected through a suitable pin and slot arrangement to a respective one of a pair of vertically disposed rocker arms 101 that are mounted in spaced relation on the rock shaft 100, and, as viewed in Figs. 4 and 8, counterclockwise movement of the rocker arms 101 will carry the feed plates 103 back along the bottom of the card B-4 until the bottom edge of the latter is engaged by the feed blades. After the card B-4 is thus engaged by the feed blades 103, the rocker arms 101 are then oscillated clockwise by the rock shaft 100 to advance the business card B-4 along a first or transverse guideway in the machine to feed rollers as 105 which are arranged in vertical opposed pairs so as to grip the business card on either side along the marginal edges thereof.

Thus, as shown in Fig. 8, a second business card B-3 is at the feeding position in the machine defined by the feed rollers 105. These feed rollers are mounted at either end of a pair of vertically spaced parallel shafts 106 and 107, and at their right outer ends these shafts are provided with a set of meshed gears 110 and 111 which are adapted to be constantly driven at a predetermined speed in a manner which will be described in more detail below, and for present purposes it need only be pointed out that the constantly driven feed rollers 105 are adapted to advance the corresponding business card at this position in the machine into a second, but longitudinal, guideway wherein a conveyor mechanism directs the record instrumentalities to the left directly toward the scanning station S. This other guideway is defined generally by a guide rail 115 that extends at right angles to the first named or transverse guideway in toward the scanning station S, and hence it will be seen that the advancing movements of the business cards in these two guideways will be at right angles one to the other. Thus, a third business card B-2 is shown in Fig. 8 as located at the right end of the guide rail 115 in position to be advanced forwardly along the guide rail 115 by another feed blade 116 which is arranged to reciprocate at right angles to the feed blades as 103. To this end, a pin on the feed blade 116 is mounted in the slotted end of the feed arm 117 and the arm 117 in turn is mounted on a rock shaft 118.

The two rock shafts 100 and 118 rock simultaneously, and this is accomplished by means of a pair of meshed bevel gears 102 and 119 that are mounted on the rock shafts 100 and 118 respectively. In this manner, each rocking movement of the rock shaft 100 is transmitted to the rock shaft 118 and the feed blade 116 through the bevel gears 102 and 119. The blade 116 normally engages the right hand or trailing edge of a business card such as the card C-2 and it will be seen then that when the rock shaft 100 turns counter-clockwise as viewed in Fig. 8, the rock shaft 118, being arranged at right angles with respect thereto, will also turn counter-clockwise to drive arm 117 and blade 116 to the left in the direction of the scanning station S.

At the scanning station, there is a conveyor represented by a set of four constantly driven conveyor belts as 125 arranged in opposite vertical pairs that are spaced to correspond to the shorter dimensions of the cards B. These belts are carried on pulleys as 126, and the lower set of pulleys nearest the feed blade 116 is mounted at the forward end of the drive shaft 130, while the upper set of pulleys is carried on a vertically spaced, parallel shaft 127. A pinion gear 128 on the upper shaft 127 is meshed with a pinion gear 129 on the lower or drive shaft 130, and this arrangement drives both sets of conveyor belts at constant speed proportional to that of the main drive shaft 140. Hence, the cards B have a constant speed through the scanning station although the rate at which they are fed to the conveyor can be varied, as will be described below.

The belts 125 are arranged so as to grip and feed the cards B advanced thereto as a result of the left-hand movements of the blade 116, as viewed in Fig. 8. Thus, the feed belts are spaced horizontally from one another a distance corresponding to the shorter edges of the cards B, and the bight between the vertical sets of feed belts 125 is aligned with the leading edge of the cards B in the second guideway so that once a card as B-1 is advanced by the feed blade 116 to the feed belts 125 the latter are effective to move this particular record instrumentality through the scanning station S at a constant speed beneath the rotating scanning head 20.

As shown in Figs. 5-7, the business cards B are of uniform rectangular shape, and these cards may each contain printed data such as addresses A, as well as other and related printed data D located precisely at predetermined different areas on the cards. These lines of data are printed on the cards parallel to the longer edges, and, as shown in Fig. 8, the cards are arranged in the supply station over the feed blades 103 at the front of the machine so that the longer edges of the cards correspond to the leading and trailing edges of the cards B advancing through the transverse guideway. Consequently, it will be seen that in the transverse guideway, the lines of data are at right angles to the advancing path of the cards B. On the other hand, the width of the second or longitudinal guideway corresponds to the shorter dimensions of the cards B; hence, in the longitudinal guideway these shorter edges become the leading and trailing edges, the lines of data are parallel to the line of advancing movement of the cards B, and the cards B are, in effect, turned at right angles relative to their original disposition.

Under and in accordance with the present invention, the data carried on the face of each of the record instrumentalities can be pre-selected for printing so that the printed copy may contain all or only some of the record data. At the same time, the present invention makes it possible to vary the pitch or distance between adjacent sets of printed data on the copy T, and these relations are achieved in the present instance by an arrangement which permits the amount of spacing between adjacent record instrumentalities in the longitudinal guideway to be selectively altered or varied. In this connection, it will be apparent that if the number of business cards as B fed or advanced to the longitudinal guideway per unit of time be increased, the spacing between adjacent ones of these record instrumentalities carried to the scanning station by the card conveyor will be decreased. It will be clear from this, of course, that the rate of feed can be selected to establish an overlapping relationship between the business cards B, and thus the number of record instrumentalities fed from the supply magazine SM per unit of time will determine directly the amount of data-bearing area which will be exposed for scanning. This in turn determines what will be reproduced at the printing station P as well as the distance or pitch between the different data printed on the copy strip T.

Such relations are illustrated in Figs. 5 to 7 of the present disclosure wherein business cards bearing individual data are compared with corresponding portions of the copy strip T. In Fig. 5, for instance, a spacing relation for the business cards B in the conveyor belts 125 is one in which the trailing edge only of a forward card B is engaged by the leading edge of the next card B. In Fig. 6 such spacing is illustrated as a special case of overlap in which the trailing portion of each business card is covered or lapped by the leading portion of the next card so that a portion of the data carried by each card is masked during the scanning operation.

The copy strip is shown as divided into individual label lengths along weakened severance lines as S-1, S-2, and S-3 of the usual kind, and in the example shown in Fig. 5 it will also be observed that the entire record carried by each of the cards B has been printed on a label of equal length. Thus, addresses as A-1, A-2, and A-3 carried by the cards B have been reproduced as printed addresses A-11, A-12, and A-13, respectively, and the other data carried by the record cards, D-1, D-2, and D-3, has also been printed as D-11, D-12 and D-13 on the respective labels of the strip T in association with the reproduced addresses. It will be noted at the same time that the lines of printed data correspond in length to that of the record data, and that the pitch L-1 of the printed data is the same as that of the record.

In Fig. 6, a different feeding condition for the record instrumentalities is illustrated wherein it is assumed that the data as D-1 carried by each of the record cards to the right of the addresses as A-1 is not needed on the copy strip T, and under such circumstances the cards are advanced by the conveyor through the longitudinal guideway to the scanning station S in an overlapped relation, in this instance an overlap of about fifty percent. This, of course, means that the time required to run all the business cards through the machine is correspondingly decreased and, since the pitch of the printed data on the strip T will be reduced by a corresponding amount, the individual labels comprising the copy strip T can be shortened as can be observed by comparing the distance between the severance lines as S-1 for the labels in Fig. 5 with those for labels in Fig. 6. Again, the pitch of the data between cards B through the scanning station is the same as that established at the printing station, this being illustrated by the common pitch line L-2.

In accordance with the present invention, the spacing between the record instrumentalities as the business cards B carried by the conveyor to the scanning station is regulated by altering the period of oscillation of the rock shaft 100 since it is this shaft which determines the rate at which the business cards are advanced through the first guideway to the second guideway. This is accomplished in the present instance by arranging a change speed mechanism between the main drive shaft 140 and the rock shaft 100. Thus, the shaft 140 includes a pulley 145, and an intermediate drive shaft 150 is arranged for rotation in a pair of spaced apart bearing support brackets 151 and 152 forwardly of the shaft 140 in parallel relation thereto. Shaft 150 carries a pulley 147 at the end opposite the pulley 145 on the drive shaft 140. The two pulleys 145 and 147 are drivingly connected by a belt 146, and hence the intermediate drive shaft 150 will be driven at a speed proportional to that of the main drive shaft 140.

The intermediate drive shaft 150 is arranged to supply power directly to a change speed mechanism 160 which, as shown in Fig. 3, is mounted on a platform 159 supported, in turn, on the main support base structure 46. To this end, a drive belt 155 is played around one pulley 156 carried on the right end of the drive shaft 150 and another pulley 157 mounted on the in-put shaft 158 of the change speed mechanism 160. The particular change speed mechanism in this instance is of the type that may be varied at will over an infinite range by means of a manually operable crank 160C, and hence the change speed mechanism 160 illustrated in Figs. 3, 4, and 8 is of the type that embodies friction cones or similar tapered rollers which can be engaged at varying diameters to vary the speed of the out-put shaft 101, Fig. 3, in relation to that of the in-put shaft 158 which, of course, remains at a constant value proportional to the drive shaft 140.

The out-put shaft 161 of the change speed mechanism 160 carries a pinion 162, and this pinion engages a transmitting gear 163 carried at one end of a stub shaft 163S that is supported for rotation at the right hand side of the machine. At its other end the shaft 163S carries a pinion 164 which meshes with another pinion gear 165, and it is this latter gear which connects the feed for the business cards B from the magazine SM to the drive described above. Thus, gear 165 meshes with gear 111 carried on shaft 106 for the feed rollers as 105, and since gears 110 and 111 are in mesh it follows that the feed rollers 105 are adapted to rotate continuously at a speed established by the setting of the change speed mechanism 160.

The gear 165 also constitutes a means for imparting oscillations to the shafts 100 and 118, and the period for such oscillations will vary accordingly as the out-put of the change speed mechanism 160 is varied. Thus, a drive link 98, Fig. 4, is pivotally connected to an eccentric pin on gear 111 that is driven by gear 165, and at its other end the drive link 98 is pivotally connected to a vertically disposed rocker arm 99 secured to the right hand end of the rock shaft 100 as viewed in Fig. 8. Accordingly, for each revolution of gear 111, the rock shafts 100 and 118 each describe a complete oscillation and for each such oscillation of the rock shaft 100 a business card B is advanced from the supply magazine SM to the feed rollers 105.

It will thus be seen that by increasing or decreasing, through the change speed mechanism 160, the number of business cards fed from the supply magazine SM per unit of time by the feed blades 103, the spacing or pitch between the data on two adjacent cards in the second guideway can be predetermined, and this, of course, also establishes the spacing of the printed data on the copy strip T. From this it will be seen that the present invention not only permits the cards in the second guideway to be overlapped to thereby reduce the amount of data to be scanned and printed, but it also permits the spacing between the printed data on the copy strip T to be varied.

As was noted above, the copy strip T to be printed is advanced through the printing station by the pin wheel 80 which is driven by the change gears 85 and 86. The strip T is relatively wide in nature and is punched along its outer marginal edge with a plurality of regularly spaced openings TO that are adapted to register in a feeding relationship with the feed pins 80P, Fig. 4, carried on the outer peripheral edge portion of the pin wheel 80. The change gears 85 and 86 are located in the transmission housing 51 at the back of the machine, and the arrangement is such that these gears may be easily removed from their respective shafts and substituted by other gearing on the same centers to establish a new gear ratio. In this manner, the speed of the drive shaft 81 for the pin wheel 80 may be altered, and the speed of the copy strip T through the printing station accordingly varied. Thus, there are many instances wherein it may be desired to provide for a lesser or greater speed of the copy strip T through the printing station, the result being that the number of printed characters per unit of length on the strip T is changed accordingly. For instance, under one set of circumstances it may be that seven printed characters per inch will be adequate, whereas under other circumstances it may be desirable to provide for nine or perhaps eleven characters per inch on the printed copy. Such definite character spacing relations may be easily accounted for by means of the change speed mechanism for the pin wheel 80 as represented by the change gears 85 and 86.

As an illustration of the foregoing, in Figs. 6 and 7 it will be noted that the record instrumentalities in each case have the same degree of overlap, so that in these two instances the rate of advancing the business cards B from the supply magazine SM is the same. Thus, the addresses A–1, A–2, and A–3 are on the same pitch, L–2, in both Figs. 6 and 7. However, the gear ratio in the change speed mechanism for driving the pin wheel 80 has been increased in the second case so that the speed of the copy strip T in Fig. 7 through the machine is greater than that for the copy illustrated in Fig. 6. As a consequence of this increased speed, the length $x$ of a line of data, such as the addressee's name on a record card, is increased to $y$ on the printed copy, and at the same time the pitch between adjacent addresses is increased from L–2 on the record cards to L–3 on the printed copy. This requires, of course, that the individual address labels comprising the copy strip illustrated in Fig. 7 each be of greater length, as compared to the labels in Fig. 6, in order that the increased number of printed characters per unit of length may be accommodated. This is shown by the relative spacing of the severance lines S–1, S–2 and S–3 in the two figures.

Figure 9:
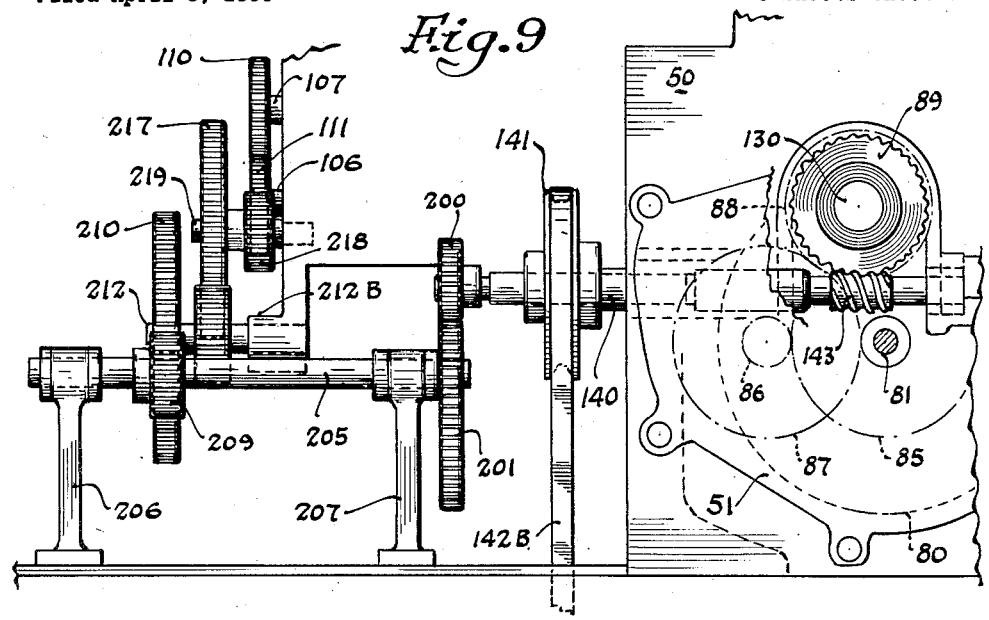
Fig. 9 is a rear elevation taken on line 9—9 of Fig. 10 and showing a modified form of the control means for controlling the feeding of the record containing instrumentalities.
Figure 10:
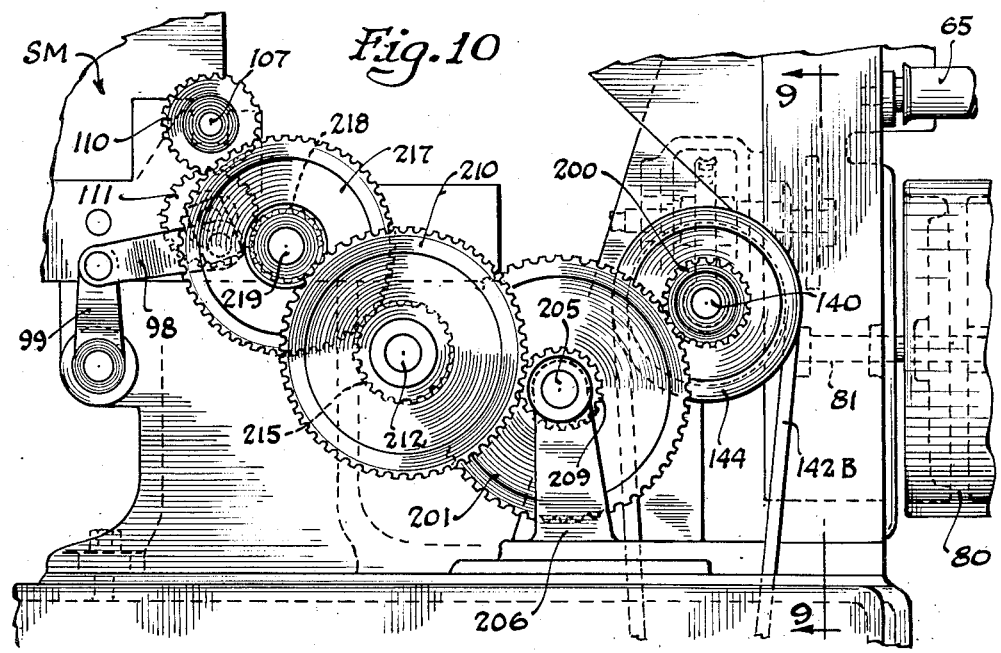
Fig. 10 is a side elevation taken on Fig. 9.
Figure 11:
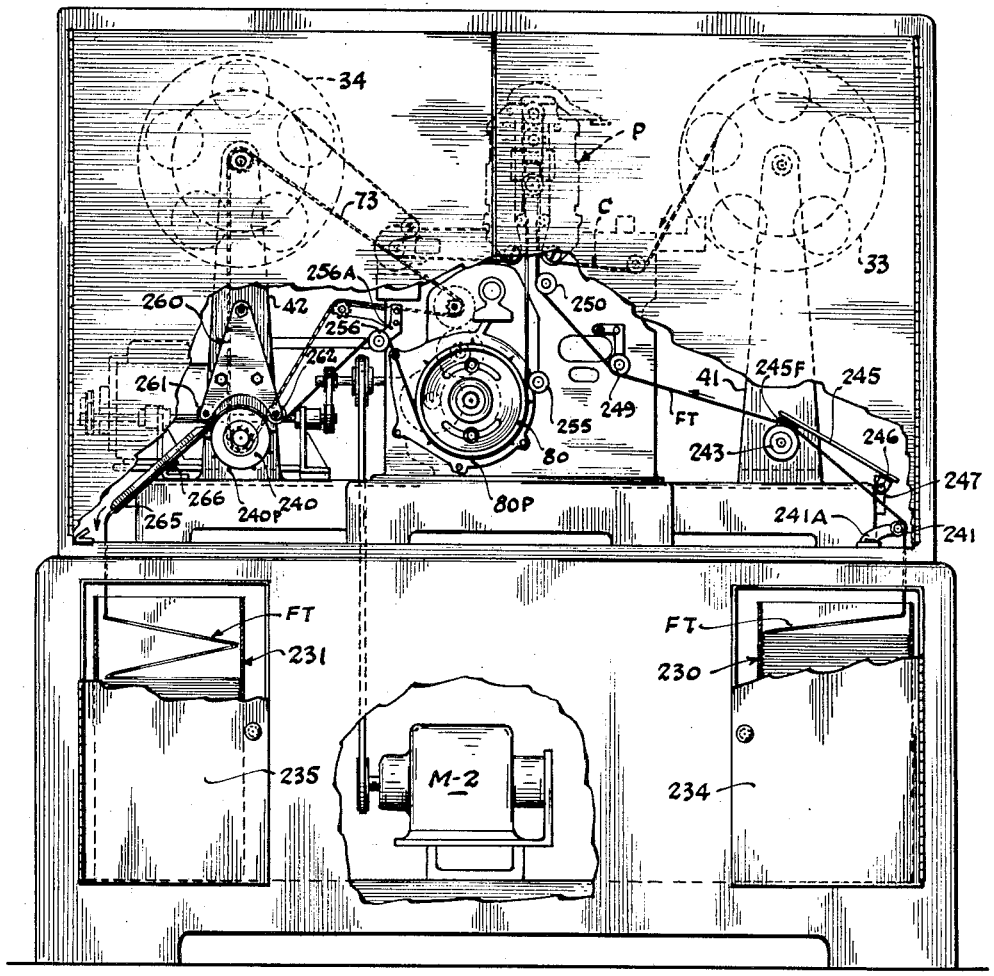
Fig. 11 is a view similar to Fig. 1, broken away in part, showing a modified form of the feed for the instrumentality to be printed.

In Figs. 9 and 10 of the present disclosure, there is illustrated a modified form for the change speed mechanism that is arranged between the main drive shaft 140 and the rock shaft 100. In this modification, the change speed mechanism takes the form of change gearing, and thus instead of being variable over an infinite range the change speed mechanism in this instance can be definitely set at a particular value for prolonged printing runs or for use in circumstances wherein the spacing between the record instrumentalities conveyed to the scanning station need only be changed occasionally for one or the other purpose.

In the modification shown in Figs. 9 and 10, the change speed mechanism between the drive shaft 140 and the rock shaft 100 is represented by a pair of change gears 200 and 201 that are mounted, respectively, on the main drive shaft 140 and an intermediate drive shaft 205. Thus, in this instance the main drive shaft 140 is again utilized as the source of power for imparting feeding movement to the rock shaft 100 and the conveyor for the cards through the scanning station. The intermediate drive shaft 205 is similar to the intermediate drive shaft 150 described above in that it is supported for rotation in a pair of vertical bearing support members 206 and 207 that are mounted in spaced relation on the main base support structure at the rear of the machine. The intermediate drive shaft 205 is thus supported in parallel spaced relation to, and somewhat forwardly of, the main drive shaft 140, as can be seen in Figs. 9 and 10, and the end of the drive shaft 205 nearest shaft 140 carries the change gear 201, the latter being meshed with the change gear 200 whereby these two gears may be substituted by other gearing on the same centers to vary the speed proportion between shaft 140 and shaft 205.

Rotation of the shaft 205 is transmitted to the rock shaft 100 so that the latter will describe periodic oscillations as described above in connection with the change speed mechanism 160, and the means whereby movement is thus transmitted includes a gear train which terminates at the gear 111 on which the eccentric drive link 98 for the rock shaft 100 is mounted. Thus, the intermediate drive shaft 205 carries a pinion gear 209 adjacent the end opposite the change gear 201, and this pinion meshes with a relatively large transmitting gear 210 carried on a stub shaft 212 which rotates in a bearing 212B at the side of the machine. Intermediate the transmitting gear 210 and the bearing 212B, shaft 212 carries a pinion 215 which is meshed with another transmitting gear 217. Gear 217 in turn is carried at the outer end of a stub shaft 219 rotatably supported at the side of the machine in parallel spaced relation to the stub shaft 212, and the shaft 219 carries a pinion 218 equivalent to the pinion 165, described above in connection with the change speed mechanism 160, in that the pinion 218 is meshed with gear 111 which carries the eccentric drive link 98. Thus, it will be seen that the pinion 218 is adapted to impart continuous rotation to gear 111 which in turn will rotate gear 110 to drive the feed rollers 105 at a speed determined by the change gears 200 and 201. At the same time, the eccentric link 98 and drive arm 99 for rock shaft 100 will oscillate with periods also determined directly by the ratio of the change gears 200 and 201. From this it will be seen that by altering the gear ratio in the change speed mechanism disclosed in Figs. 9 and 10, the rate at which business cards B are advanced one by one from the bottom of the supply magazine SM may be correspondingly altered.

In Fig. 1, the printing machine of the present invention is illustrated as arranged to handle copy material in the form of a continuous copy strip T which travels between a supply reel 30 and a take-up reel 31. This, of course, represents but one type of copy form, and in Fig. 11 the machine is shown as arranged to handle a fan-fold copy strip FT or so-called continuous manifold strip. In this instance, the table 45 of the machine is equipped with a pair of relatively large, spaced apart magazines 230 and 231 which are supported at opposite sides of the machine beneath the table top. As viewed in Fig. 11, the magazine 230 at the right side of the machine serves to hold the unprinted manifold FT in its fan-fold form, and the magazine 230 is accessible from the back of the machine through a door 234. Similarly, the magazine 231 at the other side of the machine represents a storage magazine for the printed copy which is fed thereto in a manner to be described below, and this magazine is also accessible through a door 235 at the back of the machine.

The continuous manifold form FT is advanced from the supply magazine 230 through the printing station P and then into the storage magazine 231, and to this end the copy FT is provided with a perforated edge which is adapted to cooperate with the feed pins 80P on the feed wheel 80. In the course of advancing movement from the supply magazine 230, the copy manifold first travels over a guide roller 241 that is supported at the side of the machine on an arm 241A, and the manifold is then directed across a guide roller 243 journalably mounted at the base of the supporting post 41 for the carbon supply reel 33. From the guide roller 243, the manifold is directed by a pair of rollers 249 and 250 into and through the printing station P in the manner described above in connection with Fig. 1, and during this travel a shoe 245 is adapted to apply tension to the manifold copy form. This shoe has a friction surface 245F that is adapted to bear against the copy FT as it travels over the guide roller 243, and the shoe 245 is pivotally mounted at 246 on a supporting bracket 247 located at the side of the machine as viewed in Fig. 11.

After the copy has been printed at the printing station, it is directed onto the feed wheel 80 by a guide roller 255 which corresponds to the guide roller 65, Fig. 2, and the feed wheel 80 is driven in the same manner as was described in detail above in connection with the machine as illustrated in Fig. 1. Thus, the feed wheel 80 is adapted to be driven through a change speed mechanism that is connected to the main drive shaft 140 of the machine, and hence the speed of the manifold form FT through the printing station can be varied as in the case of the continuous copy form T.

The feed wheel 80 is effective to feed the manifold form from the supply magazine 230 into the storage magazine 231, and the feed wheel 80 is assisted in this operation by another feed wheel 240 which is mounted for rotation adjacent the base of the support post 42 which mounts the carbon take-up reel 34. Thus, as the printed copy leaves the pin wheel 80 it is directed upwardly by a guide roller 256 carried on an arm 256A at the side of the feed roller 80 opposite the guide roller 255. From roller 256, the printed manifold is directed downwardly toward the pin wheel 240, and to the end that the strip FT will be directed on to the wheel 240 in an accurate feeding relationship a pair of guide rollers are arranged in embracing relation at the top of wheel 240 on opposite sides thereof. These guide rollers 261 and 262 are suspended at opposite sides of a triangular shaped mounting carriage 260 which is attached, as shown in Fig. 1, to the support post 42, and in this manner assurance is had that the feed perforations in the manifold FT are accurately engaged by the feed pins 240P on the pin wheel 240.

At the left side of the pin wheel 240 just below the roller 261, a downwardly inclined chute 265 is supported by an angle bracket 266 so that the printed manifold form FT leaving the pin wheel 240 will travel down the chute 265 and into the storage magazine 231.

From the foregoing, it will be seen that the present invention is adapted to print a continuous strip form with data that can be arranged to print a continuous strip form with data that can be arranged on a predetermined pitch by regulating the rate at which the record instrumentalities are advanced on to the conveyor traveling through the scanning station, and at the same time this permits only desired portions of the data carried by each of the record instrumentalities to be printed. In the event that it is desired to stretch out or shorten the printed image, this may be done through the change gears that drive the feed wheel for the continuous copy form, and of course this control in the machine can be correlated to the feed rate for the record instrumentalities.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a facsimile printing machine of the kind described comprising a scanning head at scanning station and a printing head at a printing station, means operatively associating said scanning and printing heads for reproducing scanned subject matter at said printing station, a supply magazine for holding a supply of data-bearing record cards or like discrete record instrumentalities that are to be advanced through the scanning station, a supply means from which a copy sheet may be advanced through the printing station, and a conveyor in the machine for transporting said cards in a line at a constant speed through the scanning station and beneath the scanning head whereby the data carried by the cards may be scanned and transmitted to the printing head to be printed on the copy sheet: the improvement comprising feed means adjacent the supply magazine for feeding said cards one by one to the conveyor at a predetermined rate whereby a corresponding spacing between cards on the conveyor may be established, other feed means for advancing the copy strip through the printing station at a predetermined speed, a change speed mechanism for operating the first-named feed means and adjustable to change the rate at which the cards are fed from the supply magazine to the conveyor to thereby permit the pitch between data on adjacent cards to be varied, and another change speed mechanism for operating the second-named feed means and adjustable to change the speed at which the copy sheet is advanced through the printing station to thereby permit the spacing between each printed character to be varied.

2. In a facsimile printing machine of the kind described for reproducing data and comprising a scanning head at a scanning station and a printing head at printing station electrically connected and arranged whereby data signals received by the scanning head are transmitted to the printing head for reproducing data on a sheet, a supply station whereat record cards or like discrete record instrumentalities, each bearing record data, are adapted to be stacked for passage through the scanning station, and a conveyor extended through said scanning station for carrying said cards in a line past the scanning head whereby data on said cards may be transmitted to the printing station: the improvement comprising means to drive the conveyor at a constant speed, feed means for feeding said cards one by one to the conveyor at a predetermined rate such that the cards are spaced a predetermined distance relative one to another on the conveyor, means oscillatable through a predetermined period for operating said reciprocating feed means whereby said cards are fed at such predetermined rate, means to drive said oscillatable means including a change speed mechanism and adjustable to change the rate of feed for said cards to the conveyor to thereby permit the pitch between data on adjacent cards on said conveyor to be varied, a feed wheel for feeding a sheet to be printed through the printing station at a predetermined speed, and means to drive said feed wheel including a change speed mechanism which is adjustable whereby the predetermined speed for said sheet to be printed may be varied to thereby vary the spacing between each printed character.

3. In a continuous strip facsimile printing machine of the kind described comprising a printing head past which a sheet to be printed may be fed at a predetermined speed and in which record cards or like discrete data-bearing instrumentalities are to be advanced past a scanning head so that the individual data carried thereby may be transmitted to the printing head to be reproduced at regular spaced intervals on said sheet, a conveyor for transporting said cards in a line at a constant speed and in predetermined space over-lapped relation one to the other past the scanning head, and a supply station whereat said cards may be arranged in a stack to be fed on to the conveyor at a predetermined rate such as to establish said predetermined spaced relation: the improvement comprising feed means adjacent the supply station for thus feeding the cards at a predetermined rate, feed means for advancing said sheet past said printing head at said predetermined speed therefor, a main drive means in the machine for imparting feeding movement to each of said feed means, a change speed means adjustable between said main drive means and the feed means for said cards whereby said predetermined rate may be varied to thereby vary the amount of over-lap betwen said cards on the conveyor, and a constant speed connection between said main drive shaft and said conveyor.

4. In a facsimile printing machine of the kind described comprising operatively associated scanning and printing heads at scanning and printing stations respectively, a supply magazine for holding a supply of record cards or like discrete record instrumentalities that are to be advanced through the scanning station, means for advancing a copy receiving sheet thorugh the printing station, and a conveyor in the machine for transporting said cards in a line at a constant speed through the scanning station and beneath the scanning head whereby data carried by the cards may be scanned and transmitted to the printing head to be printed on the copy sheet: the improvement comprising feed means adjacent the supply magazine for feeding said cards one by one to the conveyor at a rate which predetermines the amount of over-lap between cards on the conveyor, other feed means for advancing the sheet through the printing station at a predetermined speed, a main drive means arranged in the machine for driving each of said feed means, a constant speed connection from said main drive means to the conveyor whereby said cards have a constant speed past the scanning head in every instance, and a change speed mechanism adjustable between said main drive means and the first-named feed means for changing the rate at which the cards are fed from the supply magazine to the conveyor to thereby vary the over-lap between cards on the conveyor.

5. In a facsimile printing machine of the kind described comprising a scanning head and a printing head operatively arranged at respective stations and connected one to the other so that scanned subject matter may be reproduced at the printing station, a supply magazine for holding a supply of record cards or like discrete record instrumentalities each bearing data that are to be advanced through the scanning station, means for advancing copy receiving material through the printing station, and a conveyor in the machine for transporting said cards in a line at a constant speed through the scanning station and beneath the scanning head whereby subject matter carried by the cards may be scanned and transmitted to the printing head to be printed on the copy: the improvement comprising feed means adjacent the supply magazine for feeding said cards one by one to the conveyor at a predetermined rate, other feed means for advancing the copy material through the printing station at a predetermined speed, a main drive means arranged in the machine for driving each of said feed means, a constant speed connection from said main drive means to the conveyor whereby said cards have a constant speed past the scanning head in every instance, a change speed mechanism between said main drive means and the first-named feed means and adjustable for changing the rate at which the cards are fed from the supply magazine to the conveyor whereby the pitch between data on adjacent cards on the conveyor may be varied, and a change speed mechanism between the main drive means and the second-named feed means and adjustable for changing the speed at which the copy material is advanced through the printing station whereby the number of printed characters per unit of length on the copy may be varied.

6. In a facsimile printing machine of the kind described for printing on a continuous strip or the like and comprising a scanning head and a printing head at respective stations in the machine electrically connected and arranged together for the transmission of data signals from the scanning head to the printing head for reproduction on said strip, a supply station whereat record cards or like discrete record instrumentalities, each bearing record data, are adapted to be stacked for passage to the scanning station, and a conveyor extended through said scanning station for carrying record cards in a line past the scanning head whereby data on said cards may be transmitted to the printing station: the improvement comprising a main drive shaft in the machine connected to said conveyor to drive the conveyor at a constant speed through the scanning station, reciprocating feed means for feeding said cards one by one on to the conveyor at a predetermined rate such that the cards are spaced from one another on the conveyor a corresponding distance apart, means oscillatable through a predetermined period for operating said reciprocating feed means whereby said cards are fed at such predetermined rate, means to transmit the drive of the main drive shaft to said oscillatable means and including a change gear arrangement whereby the rate of feed for said cards to the conveyor may be varied to thereby vary the distance between cards on the conveyor, a feed wheel for feeding said strip to be printed through the printing station at a predetermined speed, and means to transmit the drive of said main drive shaft to said feed wheel and including a change gear arrangement whereby the predetermined speed for said strip to be printed may be varied.

7. In a continuous strip facsimile printing machine of the kind described comprising a printing head past which the strip to be printed is fed at a predetermined speed and in which record cards or the like discrete data-bearing instrumentalities are to be advanced past a scanning head operatively connected and arranged with the printing head so that the individual data carried by the cards may be transmitted to the printing head to be reproduced at regular spaced intervals on said strip, a conveyor for transporting said cards in a line at a constant speed and in predetermined spaced relation one to the other past the scanning head, and a supply station whereat said cards may be arranged in a stack to be fed on to the conveyor at a predetermined rate such as to establish said predetermined spaced relation: the improvement comprising reciprocating feed means adjacent the supply station for thus feeding the cards at a predetermined rate, means oscillatable through a predetermined period for operating said feed means, a rotating feed means for advancing said strip past said printing head at said predetermined speed therefor, a main drive shaft in the machine for imparting feeding movement to each of said feed means a change speed means between said main drive shaft and the feed means for said cards whereby said predetermined rate maybe varied to thereby vary the spacing between said cards on the conveyor, and a constant speed connection between said main drive shaft and said conveyor.

8. In a printing machine of the kind described in which data-bearing record cards at a supply station are adapted to be advanced in a line by a conveyor past a scanning head, and in which signals corresponding to the data on the cards are transmitted from the scanning station to a printing head where the signals are acted upon and the data corresponding thereto printed on a copy receiving sheet advanced past the printing head: the improvement comprising, means for advancing the record cards one by one from said magazine on to the conveyor at a rate which determines the pitch between the data on adjacent cards on the conveyor and including a change speed mechanism adjustable to vary the feed rate for the cards and thereby said pitch, and means for advancing the copy sheet to be printed past the printing head at a rate which determines the spacing between successive printed characters and including a change speed mechanism adjustable to vary the feed rate for the copy sheet and thereby the spacing between characters.

9. In a printing machine of the kind described in which data-bearing record cards at a supply station are adapted to be advanced in a line by a conveyor past a scanning head, and in which signals corresponding to the data on the cards are transmitted from the scanning station to a printing head where the signals are acted upon and the data corresponding thereto printed on a copy receiving sheet advanced past the printing head: the improvement comprising, means for advancing the record cards one by one from said magazine on to the conveyor at a rate which determines the pitch between the data on adjacent cards on the conveyor, means for advancing the copy sheet to be printed past the printing head at a rate which determines the spacing between successive printed characters, a change speed mechanism adjustable for controlling the rate at which the first-named feed means is effective to advance cards on to the conveyor, and a change speed mechanism adjustable for controlling the rate at which the copy sheet travels past the printing head, whereby desired portions of the data carried by said cards may be exposed for scanning and the spacing between successive printed characters on the copy receiving sheet may be selected.

10. In a printing machine of the kind described in which data-bearing record cards at a supply station are adapted to be advanced in a line by a conveyor past a scanning head, and in which signals corresponding to the data on the cards are transmitted from the scanning station to a printing head where the signals are acted upon and the data corresponding thereto printed on a copy receiving sheet advanced past the printing head: the improvement comprising, means for advancing the record cards one by one from said magazine on to the conveyor at a rate which determines the pitch between the data on adjacent cards on the conveyor, means for advancing the copy sheet to be printed past the printing head at a rate which determines the spacing between successive printed characters, means for imparting a constant speed to the conveyor in every instance, and a change speed mechanism adjustable for controlling the rate at which the first-named feed means is effective to advance cards on to the conveyor, whereby desired portions of the data carried by said cards may be exposed for scanning.

11. In a printing machine of the kind described in which data-bearing record cards at a supply station are adapted to be advanced in a line by a conveyor past a scanning head, and in which signals corresponding to the data on the cards are transmitted from the scanning station to a printing head where the signals are acted upon and the data corresponding thereto printed on a copy receiving sheet advanced past the printing head: the improvement comprising, means for advancing the record cards one by one from said magazine on to the conveyor at a rate which determines the pitch between the data on adjacent cards on the conveyor, means for advancing the copy sheet to be printed past the printing head at a rate which determines the spacing between successive printed characters, means for imparting a constant speed to the conveyor in every instance, and a change speed mechanism adjustable for controlling the rate at which the copy sheet travels past the printing head, whereby the spacing between successive printed characters on the copy receiving sheet may be selected.

References Cited in the file of this patent

UNITED STATES PATENTS

| | | |
|---|---|---|
| 2,571,785 | Thompson | Oct. 16, 1951 |
| 2,666,807 | Hunt | Jan. 19, 1954 |